United States Patent [19]

Auer

[11] 3,790,742

[45] Feb. 5, 1974

[54] NOZZLE

[75] Inventor: Rupert Auer, Frankfurt/Main, Germany

[73] Assignee: Messer Griesheim GmbH, Frankfurt/Main, Germany

[22] Filed: Aug. 16, 1972

[21] Appl. No.: 281,137

[30] Foreign Application Priority Data
Aug. 24, 1971 Germany.................. P 21 42 331.4

[52] U.S. Cl................ 219/121 P, 219/75, 313/231
[51] Int. Cl............................................... B23k 9/00
[58] Field of Search.......... 219/121 P, 75, 145, 146; 313/231

[56] References Cited
UNITED STATES PATENTS

| 3,562,486 | 2/1971 | Hatch | 219/121 P |
| 3,450,926 | 6/1969 | Kiernan | 219/75 X |
| 3,329,865 | 7/1967 | Jaatinen | 219/75 X |
| 3,183,338 | 5/1965 | Forney | 219/75 X |
| 3,674,978 | 7/1972 | Becker | 219/121 P |

Primary Examiner—C. L. Albritton
Attorney, Agent, or Firm—Ernest F. Marmorek

[57] ABSTRACT

Disclosed is a nozzle for a welding or plasma torch. The nozzle has an inner and an outer housing, each made of a different material. Thus, the inner housing, through which passes the plasma arc, is made of a highly heat resistant meterial. The outer housing is made of a highly heat conductive material for quickly conducting heat away from the inner housing.

7 Claims, 1 Drawing Figure

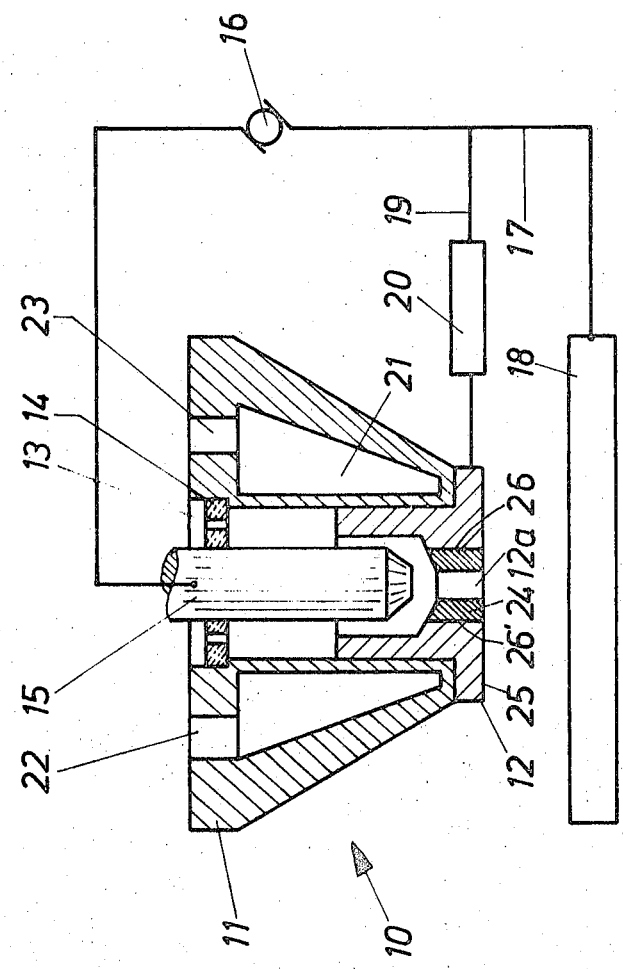

NOZZLE

BACKGROUND OF THE INVENTION

This invention relates to plasma cutting or welding torches and more particularly to a nozzle therefor.

It is well known that excessive heat radiated from the plasma arc of a plasma torch and the work piece and absorbed by the nozzle of a torch, results in the deterioration of the nozzle and, eventually, shortens its work life. To prevent the rapid deterioration of the nozzle, particularly about the nozzle hole, the nozzle is most often secured to a water cooled nozzle holder.

Obviously, it is desireable to conduct or draw off the heat absorbed at the nozzle hole as fast as possible. Thus, nozzles are frequently made of such highly conductive material as copper. Unfortunately, copper is not a very heat resistant material. As a result, such a nozzle will experience melting and an undesireable short work life.

SUMMARY OF THE INVENTION

It is, therefore, an object of this invention to provide a nozzle which has a demonstrable longer work life than copper nozzles.

It is another object of this invention to provide a heat resistant nozzle opening which can withstand high temperatures.

It is still another object of this invention to provide a simple and economical method of making such a nozzle.

In accordance with the teachings of the invention, there is provided a plasma or welding torch having an electrode supported within a nozzle holder. The nozzle in the holder comprises a first housing made of a conductive material. This first housing has an aperture therein. A second housing is made of a heat resistant material. The second housing is within the first housing aperture and so secured to the first housing that any heat absorbed by it is conducted away by the first housing. The second housing has an aperture for directing from without of the housing the plasma arc.

In another aspect of the invention, there is provided a mold for forming a nozzle. Sintered material is placed in the mold. Finally, molten conductive material is placed about the sintered material such that the molten material combines with the sintered material.

BRIEF DESCRIPTION OF THE DRAWING

The FIGURE shows a sectional view of a plasma torch constructed in accordance with the teachings of this invention and placed in a schematic representation of the work piece and interconnected circuitry.

DESCRIPTION OF THE PREFERRED EMBODIMENT

The plasma torch 10 of this invention comprises a holder 11 which may be a generally hollow housing. The holder 11 may be, for example, frusto-conical in shape and have an axially disposed cylindrical aperture extending from the base through the apex of the holder 11. Enclosed within the holder 11, with entrance and exit ports 22 and 23, respectively, at the base thereof, is an annular cooling chamber 21. The walls of the chamber 21 are defined by the exterior and cylindrical walls of the holder 11. The cylindrical aperture is counter-sunk at the base of the holder 11. An electrode 15 is secured to an insulating disc 14 which may be made, for example, of a ceramic, by a manner well known in the art. The electrode 15 is disposed in the cylindrical aperture with the disc 14 resting upon the support ledge with the tip of the electrode 15 extending toward the apex of the holder 11.

The nozzle 12 may be, for example, a generally cylindrical member with an annular flange portion at one end. The cylindrical portion is so dimensioned as to fit within the cylindrical aperture of the holder 11 with the flange placed against the planar apex end surface of the holder 11. The nozzle 12 comprises inner and outer housings. The outer housing 25 may be made of a highly conductive material, such as, for example, copper. The outer housing 25 has an axially disposed cavity for receiving the electrode 15 and a smaller, channel opening. Within this latter opening is secured the second or inner housing 24. The second or inner housing 24 may be made of a highly heat resistant material, such as, for example, tungsten and copper, or other metallic or ceramic materials as is well known. The inner housing 24 is secured by, for example joined through heat, as will be more fully described hereinafter. The inner housing 24 has a nozzle opening for permitting the arc to pass from the electrode 15 to a work piece 18.

As schematically shown, the electrode may be coupled through a suitable line to a power source 16. The other side of the source 16 may be coupled to the work piece 18 via line 17. This other side of the source 16 may also be coupled to the outer housing 25 of the nozzle 12 via line 19 and resistance 20. The ceramic disc 14 insulates the electrode 15 from the holder 11. The electrical connections between the electrode 15, nozzle 12, and work piece 18 are well known in the art.

In the preferred embodiment it has been observed that the plasma jet may be constricted to provide greater heat and employ higher currents. It has been observed that a nozzle of the type disclosed herein can withstand a plasma jet of 350 amps. passing through a nozzle opening having a diameter of 2 mm.

As is well known, the work piece 18 may serve as the anode and the electrode 15 as the cathode. This concept is also applicable where the arc is between the electrode 15 (as a cathode) and the nozzle 12 (as the anode).

The nozzle 12 of this invention may be employed, as indicated, in plasma torches. The invention also has application to other types of torches such as, for example, WIG torches.

The nozzle 12 of this invention may be made by a relatively simple process. Thus, a sintered, porous material, such as tungsten, in the form of a core or inner housing may be placed into a mold of suitable design and material, as is well known. A highly conductive material in a liquid state, such as copper, is poured in to form the outer housing. The liquid copper combines with the sintered tungsten to thereby insure good conductivity of heat absorbed through the inner housing. In this way, copper migrates into the sintered tungsten to form and integral part of the inner housing and join it to the outer housing.

What is claimed is:

1. A nozzle of the type used in plasma cutting or welding torches, such torches having an electrode supported within a holder, said nozzle comprising:
    a first outer housing comprising heat conductive material and a second inner housing comprising heat resistant material being compounded into an integral piece with said first housing; said second housing having an aperture therein for directing a plasma or welding arc; said first housing conducting heat away from said second housing.

2. A nozzle as recited in claim 1 wherein said inner housing comprises sintered tungsten and copper.

3. A nozzle as recited in claim 2 wherein said outer housing is made of copper.

4. A nozzle as recited in claim 3 wherein said holder is hollow and has therewithin a cooling chamber, said chamber is defined by interior and exterior walls of said holder, said interior wall surrounding a substantially cylindrical aperture, the electrode being supported within said cylindrical aperture, insulating means insulating the electrode from said holder; means for fixing said nozzle to one end of said holder for establishing an arc from the electrode through said nozzle to a workpiece.

5. The method of making a nozzle for a plasma cutting or welding torch comprising:
   providing a mold;
   placing a core of heat resistant material in said mold; and
   placing a conductive material in a liquid state into said mold.

6. The method as recited in claim 5 further comprising:
   permitting said conductive material to migrate into and bond with said core while solidifying.

7. The method as recited in claim 6 further comprising:
   the step of placing a core of heat resistant material in said mold includes selecting sintered porous tungsten for said core; the step of placing a conductive material in said mold includes pouring liquid copper into said mold.

* * * * *